US012669699B2

(12) United States Patent
Gossele et al.

(10) Patent No.: US 12,669,699 B2
(45) Date of Patent: Jun. 30, 2026

(54) DEVICE FOR PROTECTING AN OPTICAL SENSOR AND CORRESPONDING DRIVER ASSISTANCE SYSTEM

(71) Applicant: VALEO SYSTEMES D'ESSUYAGE, La Verriere (FR)

(72) Inventors: Frederic Gossele, La Verriere (FR); Frederic Bretagnol, La Verriere (FR); Marcel Trebouet, La Verriere (FR)

(73) Assignee: Valeo Systemes d'Essuyage

( * ) Notice: Subject to any disclaimer, the term of this patent is extended or adjusted under 35 U.S.C. 154(b) by 762 days.

(21) Appl. No.: 18/004,558

(22) PCT Filed: Jun. 7, 2021

(86) PCT No.: PCT/EP2021/065190
§ 371 (c)(1),
(2) Date: Jan. 6, 2023

(87) PCT Pub. No.: WO2022/008144
PCT Pub. Date: Jan. 13, 2022

(65) Prior Publication Data
US 2023/0280584 A1 Sep. 7, 2023

(30) Foreign Application Priority Data

Jul. 8, 2020 (FR) ...................................... 2007244

(51) Int. Cl.
| | |
|---|---|
| *G02B 27/00* | (2006.01) |
| *B60S 1/54* | (2006.01) |
| *B60S 1/56* | (2006.01) |

(52) U.S. Cl.
CPC ............ *G02B 27/0006* (2013.01); *B60S 1/54* (2013.01); *B60S 1/56* (2013.01)

(58) Field of Classification Search
CPC .......... G02B 27/0006; B60S 1/54; B60S 1/56; B08B 1/32–36; B08B 5/02; B08B 5/023; B08B 7/02; B08B 7/024; B08B 7/04
(Continued)

(56) References Cited

U.S. PATENT DOCUMENTS

| | | | |
|---|---|---|---|
| 10,286,880 B2 | 5/2019 | Schmidt et al. | |
| 10,768,412 B2 | 9/2020 | Trebouet et al. | |

(Continued)

FOREIGN PATENT DOCUMENTS

| | | |
|---|---|---|
| CN | 108622028 A | 10/2018 |
| CN | 108944713 A | 12/2018 |

(Continued)

OTHER PUBLICATIONS

Korean Patent Office, 1st Office Action (with English translation) corresponding of Korean Patent Application No. 10-2023-7004262, dated Aug. 29, 2024.

(Continued)

*Primary Examiner* — Nicholas R. Pasko
(74) *Attorney, Agent, or Firm* — Valeo Systemes d'Essuyage

(57) ABSTRACT

A device for protecting an optical sensor of a driver assistance system for a motor vehicle, with the optical sensor including an optic. The device includes an optical element arranged upstream of the optic of the optical sensor and mounted to be able to rotate about a first axis of rotation, and an electrical motor configured to rotate the optical element. The electric motor includes a rotor that rotates about a second axis of rotation intersecting with the first axis of rotation of the optical element.

10 Claims, 4 Drawing Sheets

(58) Field of Classification Search
USPC ................................................ 359/507–509
See application file for complete search history.

(56) References Cited

U.S. PATENT DOCUMENTS

| | | | |
|---|---|---|---|
| 10,953,855 B2 | 3/2021 | Bretagnol et al. | |
| 11,079,592 B2 | 8/2021 | Bretagnol et al. | |
| 11,762,194 B2 | 9/2023 | Bretagnol et al. | |
| 2014/0036132 A1* | 2/2014 | Pawlowski | B60S 1/0411 |
| | | | 348/335 |
| 2017/0244873 A1* | 8/2017 | Izabel | B60S 1/04 |
| 2018/0149949 A1 | 5/2018 | Kim et al. | |
| 2018/0272998 A1* | 9/2018 | Schmidt | B05B 7/2424 |
| 2019/0016310 A1* | 1/2019 | Matesic | B60S 1/0411 |
| 2019/0162953 A1* | 5/2019 | Bretagnol | G02B 27/0006 |

FOREIGN PATENT DOCUMENTS

| | | | |
|---|---|---|---|
| FR | 3054459 A1 | 2/2018 | |
| FR | 3058651 A1 | 5/2018 | |
| JP | H0752755 A | 2/1995 | |
| JP | 2001171491 A | 6/2001 | |
| JP | 2006251681 A | 9/2006 | |
| JP | 2008134315 A | 6/2008 | |
| JP | 201347752 A | 3/2013 | |
| JP | 2019535580 A | 12/2019 | |
| KR | 10-2018-0060634 A | 6/2018 | |
| WO | 2008/082233 A1 | 7/2008 | |

OTHER PUBLICATIONS

Japan Patent Office, 2nd Office Action (with English translation) of corresponding Japanese Patent Application No. 2023-501269, dated Mar. 29, 2024.

Japan Patent Office, Office Action (with English translation) of corresponding Japanese Patent Application No. 2023-501269, dated Dec. 8, 2023.

European Patent Office, International Search Report (with English translation) and Written Opinion of corresponding International Application No. PCT/EP2021/065190, dated Aug. 19, 2021.

Chinese Patent Office, 1st Office action dated Jan. 20, 2026 corresponding to the Chinese patent application n° 202180047875.5 along with an English translation (9 pages).

* cited by examiner

DEVICE FOR PROTECTING AN OPTICAL SENSOR AND CORRESPONDING DRIVER ASSISTANCE SYSTEM

TECHNICAL FIELD

The present invention relates to the field of driver assistance and in particular to driver assistance systems, which are installed in certain vehicles, the driver assistance system possibly including an optical sensor, such as for example a camera comprising an objective, in particular comprising at least one lens. More particularly, the invention relates to a device for protecting such an optical sensor. The invention also relates to a method for assembling such a protective device.

BACKGROUND OF THE INVENTION

Cameras that are installed in the interior of the passenger compartment of a vehicle against the rear windscreen/ window and that point backward through the rear windscreen of the vehicle are known. These cameras are well protected from exterior weather events and dirt caused by organic or inorganic pollutants. However, the angle of view for such cameras, installed in the interior of the passenger compartment, is not optimal, in particular for a parking assistance system, for example because they do not allow obstacles located in proximity to the rear of the vehicle to be seen.

For this reason, it is therefore preferred to install the cameras of driver assistance systems on the exterior of vehicles in various locations depending on the desired use, for example in the region of the front or rear bumper, or in the region of the front or rear number plate of the vehicle. In this case, the camera is therefore highly exposed to splashes of organic or inorganic dirt that can be deposited on its optic and thus reduce its effectiveness, or even make it inoperative. In particular, during wet weather, splashes of rain and dirt are observed, which can greatly affect the operability of the driver assistance system comprising such a camera. The surfaces of the optics of the cameras must be cleaned in order to guarantee that they remain in good working order.

SUMMARY OF THE INVENTION To counter the depositing of dirt on the camera, it is known practice to arrange a device for cleaning the optic of the camera, generally a sprayer of cleaning liquid, in proximity thereto, in order to remove the polluting elements that are deposited over time. However, the use of these sprayers leads to an increase in the operating cost of such a driver assistance system because they require the use of quite large amounts of cleaning liquid.

According to another solution, the camera is arranged in a protective device. However, such a protective device has a very large footprint to install. Reducing footprint is a constant aim in the automotive field, and more particularly in the field of driver assistance.

The present invention proposes to at least partially overcome the aforementioned drawbacks by providing an alternative device for protecting an optical sensor, making it possible to prevent the depositing of dirt on an optical sensor, such as a camera, and the arrangement of which is optimized in order to reduce the footprint thereof.

To this end, the invention relates to a device for protecting an optical sensor of a driver assistance system for a motor vehicle, the optical sensor comprising an optic, said device including:

an optical element configured to be positioned upstream of the optic of the optical sensor and rotatably mounted about a first axis of rotation, and a motor, in particular an electric motor, configured to rotate the optical element.

According to the invention, the motor comprises a rotor configured to rotate about a second axis of rotation that intersects the first axis of rotation of the optical element.

Such an arrangement makes it possible to reduce the footprint of the protective device and in particular facilitates the positioning thereof in a single housing for assembly on a motor vehicle.

The device for protecting the optical sensor can further include one or more of the following features, taken individually or in combination:

the second axis of rotation of the motor is substantially perpendicular to the first axis of rotation of the optical element;

the optical element is at least partially transparent;

the optical element is separate from the optical sensor;

the optical element is configured to be arranged with respect to the optic of the optical sensor so that the first axis of rotation of the optical element is parallel coincident with the optical axis of the optical sensor;

the optical element is configured to be arranged with respect to the optic of the optical sensor so that the first axis of rotation of the optical element is coincident with the optical axis of the optical sensor;

said device includes at least one means for transmitting the movement of the rotor of the motor to the optical element;

the transmission means include at least two sprocket wheels, including a first sprocket wheel configured to be driven by the rotor of the motor and configured to drive a second sprocket wheel;

said device includes a housing configured to receive the optical sensor and the motor;

the optical sensor and the motor are received in a single recess of the housing;

the housing is configured to receive said at least one transmission means;

the optical sensor, the motor and said at least one transmission means are received in a single recess of the housing;

said device further includes a module for generating and/or spraying air onto at least one region of the optical element;

the air generating and/or spraying module is configured to generate and spray a jet of compressed air;

the jet of compressed air preferably has a pressure of less than 10 bar;

the air generating and/or spraying module is configured to generate a predetermined volume of air, for example of the order of 10 ml;

the air generating and/or spraying module includes at least one air spray nozzle;

the air spray nozzle is arranged fixedly with respect to the optical element;

the air spray nozzle is arranged so that it sprays a jet of air onto the central region of the optical element;

the air generating and/or spraying module comprises at least one air generating member;

said at least one air generating member is selected from at least a piston, a pump, an air reservoir, and an impeller;

the air generating and/or spraying module comprises at least one valve or solenoid valve;

the air generating and/or spraying module includes at least one pump in order to generate a jet of air and an air reservoir connected to the pump so as to store the air jet generated by the pump;

the air generating and/or spraying module further includes at least one valve connected to the air reservoir and to the spray nozzle, making it possible to adjust the air jet sent to the spray nozzle to a predetermined air volume and pressure;

the housing is configured to receive said at least one air generating member;

at least one air generating member is received in the same recess as the optical sensor, and/or the motor, and/or said at least one transmission means;

the optical element has at least one surface configured to be positioned in the field of view of the optical sensor;

the optical element has at least one at least partially planar or substantially planar surface configured to be positioned in the field of view of the optical sensor;

the optical element has at least one at least partially spherical or substantially spherical surface configured to be positioned in the field of view of the optical sensor;

the optical element has at least one partially aspherical surface configured to be positioned in the field of view of the optical sensor;

said at least one surface has an extent larger than or equal to the extent of the field of view of the optical sensor;

the optical element is positioned centered with respect to the first axis of rotation.

The invention also relates to a driver assistance system including an optical sensor comprising an optic. According to the invention, said system includes a device for protecting the optical sensor as defined above.

BRIEF DESCRIPTION OF DRAWINGS

Further features and advantages of the invention will become more clearly apparent on reading the following description, which is given by way of illustrative and non-limiting example, and the appended drawings, in which.

DETAILED DESCRIPTION OF THE INVENTION

In these figures, identical elements have the same reference signs.

The following embodiments are examples. Although the description refers to one or more embodiments, this does not necessarily mean that each reference relates to the same embodiment, or that the features apply to just one embodiment. Individual features of different embodiments can also be combined or interchanged in order to provide other embodiments.

In the description, certain elements can be given ordinal numbers such as first element or second element, for example. In this case, the ordinal number is simply to differentiate and denote elements that are similar but not identical. This ordinal numbering does not imply that one element takes priority over another and such numbering can easily be interchanged without departing from the scope of the present description. Likewise, this ordinal numbering does not imply any chronological order.

Figure 1:
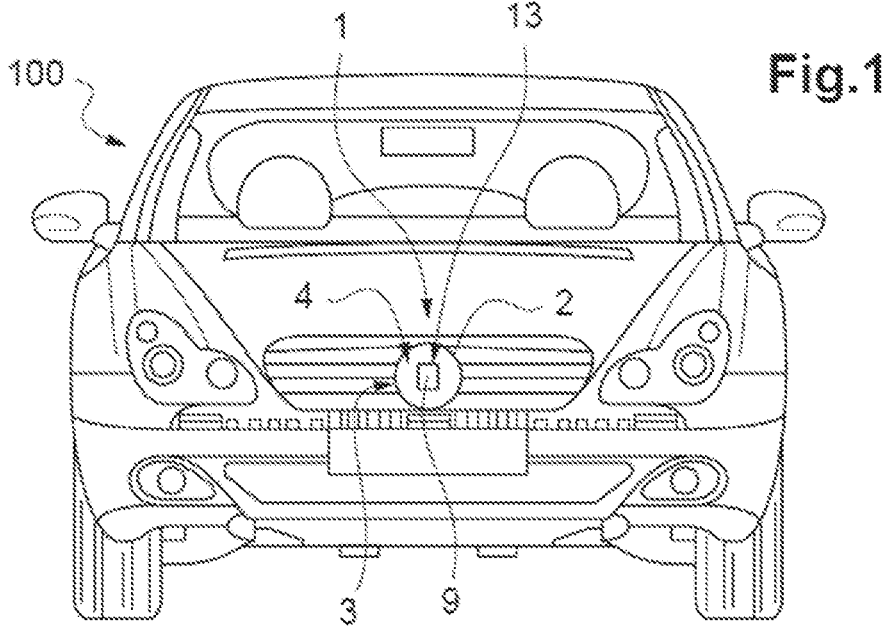
FIG. 1 schematically shows a motor vehicle comprising a driver assistance system according to the invention.

FIG. 1 shows a motor vehicle 100 provided with at least one driver assistance system 1 according to the invention.

Figure 2:
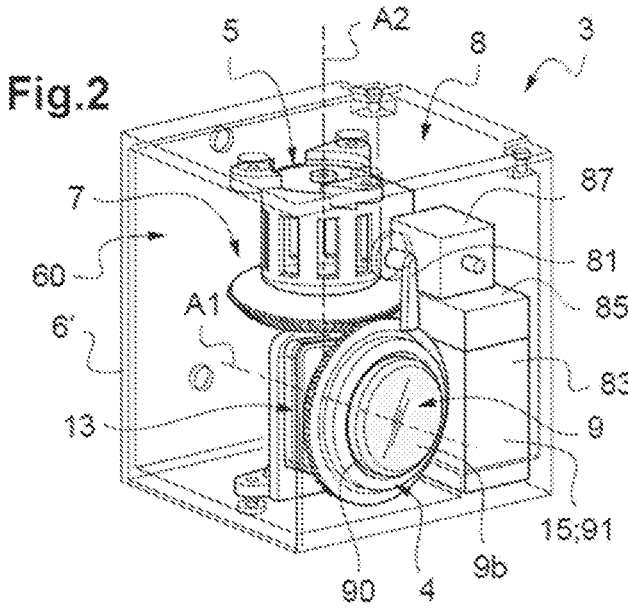
FIG. 2 is a perspective view of a device for protecting an optical sensor.
Figure 3:
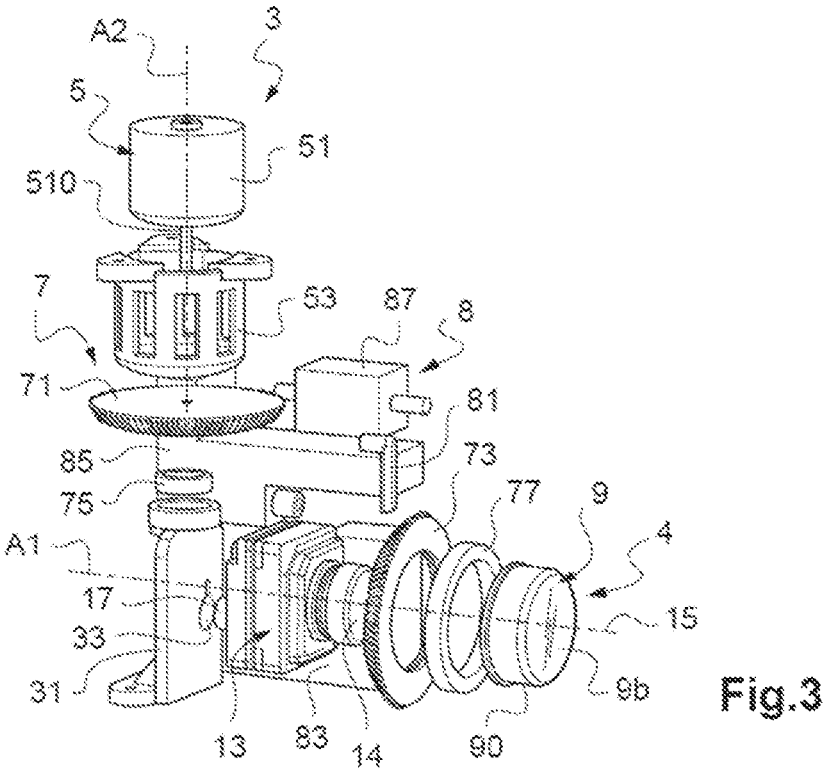
FIG. 3 is an exploded view of the protective device in FIG. 2 in which a housing receiving the different elements of said device has been removed, FIG. 4 schematically shows an optical element and an air spray nozzle of said device, FIG. 5a schematically shows a side view of the optical element with a drop of water, FIG. 5b schematically shows the optical element in FIG. 5a after the spraying of an air jet, FIG. 6a schematically shows a region of the optical element subjected to the air jet, and FIG. 6b schematically shows the optical element and the surface subjected to the air jet after rotation of the optical element.

The driver assistance system 1 includes in particular at least one optical sensor 13 and a device 3 for protecting the optical sensor 13, more clearly visible in FIGS. 2 and 3.

The optical sensor 13 is for example an image-capturing optical sensor 13 such as a camera. It can be a CCD (charge-coupled device) sensor or a CMOS sensor including an array of miniature photodiodes. According to another variant, it can be a LIDAR (light detection and ranging) sensor.

As is more clearly visible in FIG. 3, the optical sensor 13 includes an optic 14 having an optical axis 15. The optic 14 is for example an objective. An objective can include at least one lens, and in particular, depending on the field of view and resolution, a plurality of lenses, for example between two and ten lenses, generally four or five lenses, or even ten lenses in the case of a fish-eye. At least one of the lenses of the optic 14 is for example convex (curved), its convexity being oriented toward the exterior of the optical sensor 13, for a fish-eye for example.

A holder 17 of the optical sensor 13 can also be provided. This holder 17 is arranged behind the optical sensor 13 on the side opposite to the optic 14.

In the embodiment illustrated, the optical sensor 13 is intended to be mounted in the protective device 3. More precisely, the optical sensor 13 and in particular its holder 17 are intended to be fixedly mounted in the protective device 3.

In addition, the protective device 3 can include a mount 31 intended to be fastened to the housing 6' and to which the holder 17 of the optical sensor 13 is fastened. To this end, an orifice 33 can be made in the mount 31 for receiving a shaft of the holder 17.

According to the example illustrated in FIG. 1, the protective device 3 is mounted at the front of the motor vehicle 100 in the region of a bumper. Of course, as a variant, the protective device 3 can be mounted at the rear of the motor vehicle 100, for example in the region of the bumper or the number plate. It can also for example be mounted on a side of the vehicle, for example in the region of a rear-view mirror.

The protective device 3 can be fastened, using any known technique, to any element 2 of the vehicle 100, such as an element of the body or an exterior element such as a bumper, a rear-view mirror or a number plate. This can include, but is not limited to, a system of clips, a screwing system, or even an adhesive-bonding system.

Protective Device

More precisely, again with reference to FIGS. 2 and 3, the protective device 3 includes:

at least one accessory 4 for a motor vehicle 100 (also with reference to FIG. 1), this accessory 4 being rotatably mounted about a first axis of rotation A1 and having the function of protecting the optical sensor 13, and an actuator, more precisely a motor 5, in particular an electric motor, configured to rotate the accessory 4.

The protective device 3 is therefore a motorized device.

The protective device 3 advantageously further includes a housing 6' (FIG. 2 for containing or forming a holder for all of the elements of the protective device 3. The housing 6' can also contain the optical sensor 13.

In particular, the protective device 3 can include a first sub-assembly and a second sub-assembly, assembled with each other and arranged in the housing 6'. The first sub-assembly can include the accessory 4. The second sub-assembly can include the motor 5.

Accessory

The accessory 4 or protective means can be at least partially transparent.

In the embodiment described, the accessory 4 includes an optical element 9 (see FIGS. 2 and 3).

The optical element 9 is intended to protect the optic 14 of the optical sensor 13 from potential splashes of dirt or solid debris that could damage the optic 14. It is therefore an element for protecting, or more precisely a mask for protecting, the optical sensor 13. To this end, the optical element 9 is intended to be positioned upstream of the optic 14 of the optical sensor 13. In the present text, the term upstream is defined with respect to the optical axis 15 and with respect to the road scene images of which the optical sensor 13 participates in capturing. In other words, "upstream" of the optic 14 is given to mean a position in which the optical element 9 is positioned between the optic 14 and the road scene images of which the optical sensor 13 participates in capturing, along the optical axis 15. It is this optical element 9 that is subjected to attacks from the exterior, that is, to splashes of water and pollutants, stone chips, and pollutant deposits or water marks.

This optical element 9 is advantageously dimensioned so as to cover all of the surface of the optic 14. The optical element 9 is therefore arranged in the field of view of the optical sensor 13. To this end, the optical element 9 is advantageously at least partially transparent in order not to adversely affect the effectiveness of the optical sensor 13. This optical element 9 can be made from glass or a transparent plastic such as polycarbonate. The optical element 9 has at least one surface 9a, 9b (see FIGS. 5a and 5b), central in this case, intended to be positioned at least partially facing the optic 14. Again with reference to FIGS. 2 and 3, the optical element 9 has a peripheral rim 90 intended to at least partially surround the optic 14.

The optical element 9 can be arranged centered with respect to the optical sensor 13, and more precisely centered with respect to the optic 14. The optical element 9 is arranged so that its optical axis 91 is parallel to, or even coincident with, the optical axis 15 of the optical sensor 13.

In the embodiment described, the optical element 9 is separate from the optical sensor 13.

This optical element 9 has an optical axis 91.

According to the example illustrated, with the protective device 3 mounted at the front of the vehicle 100, the optical element 9 is arranged at the front of the protective device 3, oriented toward the front of the motor vehicle 100. In other words, the optical element 9 is arranged at the front of the accessory 4, or at the front of the housing 6'. "Front of the protective device 3" is given to mean the portion intended to face the road scene images of which the optical sensor 13 participates in capturing, when the protective device 3 is mounted on the vehicle 100 (FIG. 1).

Of course, as a variant, the optical sensor 9 can be oriented toward the rear of the motor vehicle 100, or can be mounted on a side of the vehicle, for example in the region of a rear-view mirror.

In addition, the optical element 9 is arranged so that it is rotated by the motor 5, in order to allow the optical element 9 to be cleaned via a centrifugal effect. The optical element 9 is advantageously positioned so that its axis of rotation A1 is parallel, or substantially parallel, to the optical axis 15 of the optical sensor 13, when the protective device 3 and the optical sensor 13 are mounted in the housing 6'. Advantageously, the first axis of rotation A1 of the optical element 9 is coincident with the optical axis 15 of the optical sensor 13. This first axis of rotation A1 is also parallel to or coincident with the optical axis 91 of the optical element 9.

The optical element 9 can be positioned centered with respect to the first axis of rotation A1. This optical element 9 in particular has rotational symmetry about the first axis of rotation A1.

In addition, when the protective device 3 receiving the optical sensor 13 is mounted on the vehicle 100 (also with reference to FIG. 1), the optic 14 and the optical element 9 advantageously protrude from an aperture provided in the element 2 of the vehicle 100.

The optical element 9 can further have at least one surface 9a, 9b configured to be positioned at least partially in the field of view of the optical sensor 13. This surface 9a, 9b advantageously has an extent larger than or equal to the extent of the field of view of the optical sensor 13.

According to one embodiment, this surface 9a, 9b is at least partially, or even completely, planar in the field of view of the optic 14 of the optical sensor 13. The at least partially planar optical element 9 can be produced simply.

As a variant, the at least one surface 9a, 9b is at least partially spherical or substantially spherical in the field of view of the optical sensor 13.

According to a further variant, the at least one surface 9a, 9b is at least partially aspherical in the field of view of the optical sensor 13.

In particular, according to the embodiment described, the optical element 9 includes an internal surface 9a and an external surface 9b that are opposite each other. The surfaces 9a, 9b can be seen more clearly in FIGS. 5a and 5b. The internal surface 9a of the optical element 9 is the surface intended to be arranged facing the optic 14 of the optical sensor 13.

Also with reference to FIGS. 2 and 3, the internal surface 9a and external surface 9b are partially or completely located in the field of view of the optical sensor 13 when the optical sensor 13 is accommodated in the housing 6'. The internal surface 9a and the external surface 9b can be parallel. The surfaces 9a, 9b are advantageously centered with respect to the optical sensor 13, and more precisely with respect to the optic 14.

In addition, in order to prevent condensation forming between the optic 14 and the optical element 9, the internal surface 9a of the optical element 9 advantageously has an anti-fog property. In particular, the internal surface 9a of the optical element 9 has an anti-fog coating.

As a variant or in addition, the internal surface 9a and/or the external surface 9b of the optical element 9 can have one or more of the following properties: hydrophobic, infrared filter, photocatalytic, superhydrophobic, lipophobic, hydrophilic, or even superhydrophilic, stone-chip resistant, or any other surface treatment allowing the adhesion of dirt to be reduced. In particular, by virtue of the hydrophobic properties of the external surface of the optical element 9, any water drops will run off the external surface without leaving marks because the water will not be able to adhere to this external surface. Thus, the layers or coatings on the external surface 9b of the optical element 9 make it possible to limit the potential adherence of organic or inorganic pollutants and the presence of water marks on the optical element 9, which could adversely affect the satisfactory operation of the driver assistance system 1. Advantageously, a liquid solution, such as a solution of the Rain-X® type, can be deposited on the external surface 9b of the optical element 9 in order to form a hydrophobic film. These exemplary embodiments are given by way of non-limiting illustration. For example, a person skilled in the art can use a transparent optical element 9 having an external surface 9b having other properties making it possible to limit the adherence of dirt to this external surface 9b without departing from the scope of the present invention.

Optionally, the optical element 9 can also comprise an integrated defrosting or demisting system in order to make it possible to guarantee that the driver assistance system 1 is able to operate satisfactorily whatever the meteorological conditions, such as a defrosting filament or resistor for example.

Advantageously, at least one means for limiting condensation is provided, referred to hereinafter as anti-condensation means (not shown in the figures). Such anti-condensation means can be provided on the rim of the optical element 9 at least partially surrounding the optic 14. By way of non-limiting example, the anti-condensation means can comprise at least one through-orifice. Preferably, when a plurality of orifices are provided, they are arranged symmetrically with respect to the axis of rotation A1 of the optical element 9. In addition, one or more semi-permeable membranes can be provided (not shown), respectively arranged in line with an orifice. These membranes are permeable to air and impermeable to water, thus promoting satisfactory ventilation between the optic 14 and the optical element 9 and thus preventing the accumulation of condensation.

In addition, according to a variant embodiment not shown, the protective device 3 can further include a rotating housing rigidly connected to the optical element 9 intended to be rotated by the motor 5 by means of the transmission means 7. This can in particular be a rotating housing capable of at least partially receiving the optical sensor 13.

Drive

With regard to the motor 5, this is advantageously a small, or even miniature, electric motor.

"Small electric motor" is given to mean, within the scope of the present invention, a stepper motor, an actuator, a brushed or brushless DC motor, an asynchronous motor or a synchronous motor, the weight of which is less than 10 kg, or even less than 1 kg, used in particular to actuate equipment in vehicles.

"Miniature electric motor" is given to mean, within the scope of the present invention, a stepper motor, an actuator, a brushed or brushless DC motor, an asynchronous motor or a synchronous motor, the weight of which is less than 200 g, or even less than 100 g, preferably between 30 g and 100 g, and for example between 30 g and 7 g.

By way of non-limiting example, the motor 5 can more particularly be a brushless motor.

The motor 5 can have a rotation speed of between 1,000 and 50,000 revolutions/minute, preferably between 5,000 and 20,000 revolutions/minute, and even more preferably between 7,000 and 15,000 revolutions/minute. Such rotation speeds allow any dirt that has been deposited on the optical element 9 to be removed via a centrifugal effect and thus make it possible to keep the optic 14 of the optical sensor 13 clean in order to ensure that the driver assistance system 1 operates optimally. According to a particularly advantageous embodiment described below, the rotation speed can be reduced to a speed of the order of 4,000 to 5,000 revolutions/minute.

The motor 5 is for example supplied with electrical power by a power supply connected to the general electrical circuit of the vehicle 100 (also with reference to FIG. 1).

Again with reference to FIGS. 2 and 3, the motor 5 is rotatably mounted about a second axis of rotation A2. The motor 5 includes a rotor 51 and a fixed stator 53, the rotor 51 being able to rotate with respect to the fixed stator 53. The rotor 51 has a rotating shaft 510. According to the embodiment illustrated, the stator 53 is positioned around the rotor 51. The stator 53 is therefore external and the rotor 51 internal.

The motor 5 is configured to rotate the accessory 4, namely in this example the optical element 9.

The motor 5, in particular the rotor 51, is rotatably mounted about a second axis of rotation A2. The motor 5 is for example arranged so that its axis of rotation A2 intersects the axis of rotation A1 of the optical element 9, and the optical axis 15 of the optical sensor 13. More particularly, the motor 5 is arranged so that its axis of rotation A2 is perpendicular or substantially perpendicular to the first axis of rotation A1 of the optical element 9, and to the optical axis 15 of the optical sensor 13. Such an arrangement makes it possible to obtain a compact assembly received in the housing 6'.

In this case, the protective device 3 includes at least one means 7 for transmitting the movement of the rotating shaft of the electric motor to the optical element. According to the example illustrated, the transmission means 7 include at least two sprocket or toothed wheels 71 and 73. A first sprocket wheel 71 is positioned so that it can rotate about the second axis of rotation A2. A second sprocket wheel 73 is positioned meshed with the first sprocket wheel 71, and so that it can rotate about the first axis of rotation A1. The rotating shaft 510 is coupled to the first sprocket wheel 71 in order to rotate it about the second axis of rotation A2. This first sprocket wheel 71 in turn rotates the second sprocket wheel 73 about the first axis of rotation A1. The first sprocket wheel 71 can be mounted on the mount 31 with the interposition of a bearing, such as a ball bearing 75.

The second sprocket wheel 73 is configured to rotate the optical element 9. Another bearing can in particular be provided, such as a ball bearing 77, between the second sprocket wheel 73 and the optical element 9, in particular the peripheral rim 90 of the optical element 9. The second sprocket wheel 73 has a central orifice for at least partially receiving the optical element 9 and the bearing 77.

For a compact arrangement, the second sprocket wheel 73 can also be positioned around the optic 14 of the optical sensor 13.

Air Generating and/or Spraying Module

Figure 4:
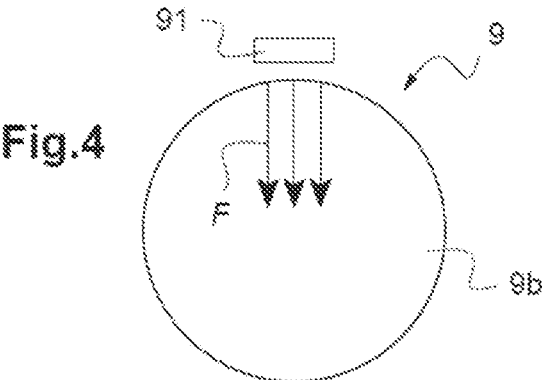

According to a particular embodiment, the protective device 3 further includes an air generating and/or spraying module 8. This module 8 is suitable for generating and/or spraying at least one air jet onto at least one region of the optical element 9. The air jet sprayed onto the optical element 9 is represented by the arrows F in FIGS. 4 and 5b.

In particular, it is a jet of compressed air F. The jet F of compressed air in particular has a pressure of less than 10 bar, for example between 1 bar and 2 bar, and preferably of the order of 1.5 bar.

The air generating and/or spraying module 8 FIGS. 2 and 3 is also configured to generate a predetermined volume of air, for example of the order of 10 ml.

To this end, the air generating and/or spraying module 8 includes at least one air spray nozzle 81, visible in FIGS. 2 and 3 and shown very schematically in FIG. 4, FIG. 5*b* and FIG. 6*a* and FIG. 6*b*.

The air spray nozzle 81 is arranged fixedly with respect to the optical element 9. This air spray nozzle 81 is situated above the optical element 9, with reference to the positioning of the elements in FIGS. 2 thru 6*b*, which corresponds to the final arrangement on the motor vehicle. The air spray nozzle 81 is in particular arranged in proximity to the optical element 9.

In addition, the air spray nozzle 81 is arranged so that it sprays the air jet F at least onto the central region of the optical element 9. In particular, the air spray nozzle 81 is arranged so that it sprays the air jet F onto the central region and optionally onto a lower region of the optical element 9. The term lower is denoted with reference to the positioning of the elements in FIG. 6*a*. The lower region corresponds to the region furthest from the air spray nozzle 81. The whole of the region of the external surface 9*b* of the optical element 9 onto which the air jet F is sprayed is referred to as Z1 and is shown schematically in FIG. 6*a*. The shape of the air spray nozzle 81 can be modified so as to adjust the air jet F. This representation of the region Z1 subjected to the air jet F is very schematic, and in particular, as the optical element 9 is rotatable, it is clear that the region Z1 of the optical element 9 subjected to the air jet F is not the same during rotation.

According to the example illustrated, the air spray nozzle 81, in particular the end thereof, can have a generally conical shape, and as a result the sprayed air jet F reaches a generally triangular or V-shaped region Z1 of the optical element 9. In this example, the apex of the triangular shape is level with or near the center of the external surface 9*b* of the optical element 9 and the base of the triangular shape is level with the lower portion, with reference to the positioning of the external surface 9*b* of the optical element 9 in FIG. 6*a*.

Figure 5A:
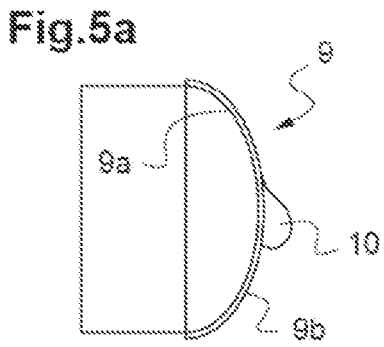
Figure 5B:
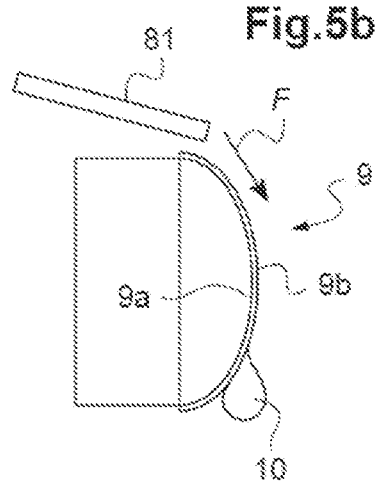
Figure 6A:
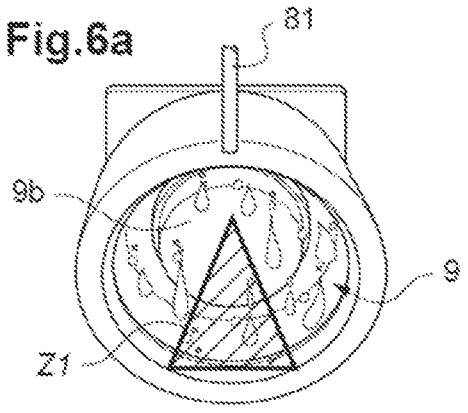
Figure 6B:
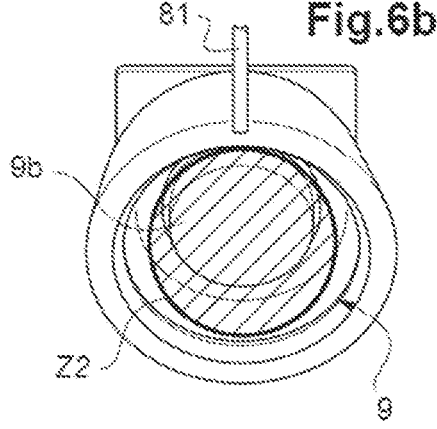

With reference to FIG. 5*a* and FIG. 5*b*, the spraying of the air jet F makes it possible to remove any small drops of water 10 remaining in the center or substantially in the center of the optical element 9. The air jet F can be sprayed evenly onto the external surface 9*b* of the optical element 9.

In particular, the air generating and/or spraying module 8 can be implemented while the optical element 9 is rotating. In combination with the rotation of the optical element 9, all or practically all of the external surface 9*b* of the optical element 9 is swept by the air jet F, as schematically shown by the circular region Z2 in FIG. 6*b*.

The jet F of advantageously compressed air sprayed by the air spray nozzle 81 makes it possible, in conjunction with the rotation of the optical element 9, to ensure optimized cleaning thereof. Closer to the center of the optical element 9, small drops of water or dirt situated in or near the center of the optical element 9 can be more difficult to eliminate as the rotation speed at the center can be insufficient to remove them. Such a water drop is shown schematically and denoted by reference sign 10 in FIG. 5*a* and FIG. 5*b*. In order to eliminate these small water drops in the center, the rotation must be very fast, for example greater than 10,000 revolutions/minute. As an alternative, by spraying a small volume of compressed air, for example 10 ml of compressed air at 1.5 bar, for a certain period, namely 100 ms in the case described to release the predetermined 10 ml of compressed air, in the time taken to release this given air volume, all or practically all of the external surface 9*b* of the optical element 9 passes one or more times, for example six to seven times, under the air jet F.

This makes it possible to remove not only the water drops 10 from the center of the external surface 9*b* of the optical element 9 but also those on the periphery thereof. As the air jet cleans the optical element 9 in conjunction with the rotation thereof, the speed of the motor 5 can be reduced, in particular to around 4,000 to 5,000 revolutions/minute.

Of course, the example of an air volume of 10 ml at a pressure of 1.5 bar is an illustrative, non-limiting embodiment. The volume and pressure values can be adjusted, in particular with a view to minimizing the protective device 3.

According to another embodiment, the continuous spraying of air onto the external surface 9*b* of the optical element 9 can be envisaged.

In addition, according to a variant, not illustrated, the protective device 3 can comprise a plurality of spray nozzles, and in particular nozzles for spraying another fluid, such as cleaning liquid.

The air generating and/or spraying module 8 also comprises at least one air generating member. This can for example be an external member that is not attached to the motor 5. This can include, but is not limited to, one or more pistons, one or more pumps, one or more air reservoirs, or one or more impellers. The air generating and/or spraying module 8 can also comprise one or more valves or solenoid valves.

According to another particular example illustrated in FIG. 2 and FIG. 3, the air generating and/or spraying module 8 includes:

at least one pump 83 or micro-pump, in order to generate an air jet, and an air reservoir 85 connected to the pump 83 so as to store the air jet generated by the pump 83.

In this example, the air generating and/or spraying module 8 further includes at least one valve or solenoid valve 87 connected to the air reservoir 85 and to the spray nozzle 81, making it possible to adjust and control the air jet sent to the spray nozzle 81, in particular in order to deliver a predetermined air volume, for example 10 ml, at a predetermined pressure, for example 1.5 bar. The valve 87 or solenoid valve makes it possible to release the air jet sequentially.

Of course, any other means making it possible to generate or produce an air jet can be envisaged. Any means making it possible to convey the air and/or to spray the air onto the external surface 9*b* of the optical element 9 can also be envisaged.

According to an alternative not shown, the motor 5 provided for rotating the optical element 9 can be used to generate the air jet F to be sprayed onto the optical element 9.

Housing

Again with reference to FIG. 3, the housing 6' is advantageously a sealed housing 6'. The housing 6' can be made from any suitable material known to a person skilled in the art.

This housing 6' is configured to receive the optical sensor 13 and the motor 5. In particular, the housing 6' can define a recess 60 receiving both the optical sensor 13 and the motor 5.

This housing 6' can also receive the means 7 for transmitting the movement of the rotating shaft 510 to the optical element 9. The transmission means 7 can be received in the same recess 60 as the motor 5 and the optical sensor 13.

As mentioned above, the protective device 3 can include an air generating member, and in this case the housing 6' can receive this air generating member, in particular in the same recess as the optical sensor 13, the motor 5, and the transmission means 7.

According to the embodiment illustrated, the recess 60 also contains the pump 83, the air reservoir 85 and the valve or solenoid valve 87. Of course, the pump 83 and the air reservoir 85 can be remote, that is, they can be arranged outside the housing 6' next to the optical sensor 13.

In addition, a sealed arrangement is advantageously provided on the housing 6' at the rear of the motor 5 for the passage of cables or wires, in order to limit the ingress of water vapor and/or other contaminants into the interior of the protective device 3.

Thus, during operation, the actuator, more precisely the motor 5, rotates the first sprocket wheel 71, which in turn rotates the second sprocket wheel 73 meshed with the optical element 9. The rotation of the optical element 9, optionally combined with the spraying of a fluid, such as a jet of compressed air, onto the external surface 9b of the optical element 9, ensures the elimination of the dirt due to the centrifugal force to which it is subject. The field of view of the optical sensor 13 thus remains clear.

In addition, producing this protective device 3 with an axis of rotation A2 of the motor 5 intersecting or even perpendicular to the axis of rotation A1 of the optical element 9 makes it possible to reduce the footprint of the protective device 3 and obtain a very compact device 3. This particularly facilitates the mounting thereof on the motor vehicle 100.

What is claimed is:

1. A device for protecting an optical sensor of a driver assistance system for a motor vehicle, the optical sensor including an optic, comprising:
    an optical element positioned upstream of the optic of the optical sensor and rotatably mounted about a first axis of rotation, so that the first axis of rotation is parallel to or coincident with the optical axis of the optical sensor, and
    an electric motor configured to rotate the optical element, wherein the electric motor includes a rotor configured to rotate about a second axis of rotation that intersects the first axis of rotation of the optical element.

2. The device as claimed in claim 1, wherein the second axis of rotation is substantially perpendicular to the first axis of rotation.

3. The device as claimed in claim 1, further comprising at least one transmission for transmitting the movement of the rotor of the electric motor to the optical element.

4. The device as claimed in claim 1, further comprising a housing configured to receive the optical sensor and the electric motor.

5. The device as claimed in claim 1, further comprising a module for generating or spraying air onto at least one region of the optical element.

6. The device as claimed in claim 1, further comprising a module for generating and spraying air onto at least one region of the optical element.

7. The device as claimed in claim 6, wherein the module includes at least one of a piston, a pump, an air reservoir, and an impeller.

8. The device as claimed in claim 6, wherein the module includes:
    at least one pump for generating an air jet, and
    an air reservoir connected to the pump so as to store the air jet generated by the pump.

9. The device as claimed in claim 6, wherein the module includes at least one air spray nozzle.

10. The device as claimed in claim 9, wherein the air spray nozzle is arranged so that it sprays an air jet onto a central region of the optical element.

* * * * *